Dec. 21, 1954     C. A. ANDERSON ET AL     2,697,616
DRAFT AND BUFFER RIGGING FOR VEHICLES
Filed May 14, 1951                                        2 Sheets-Sheet 2
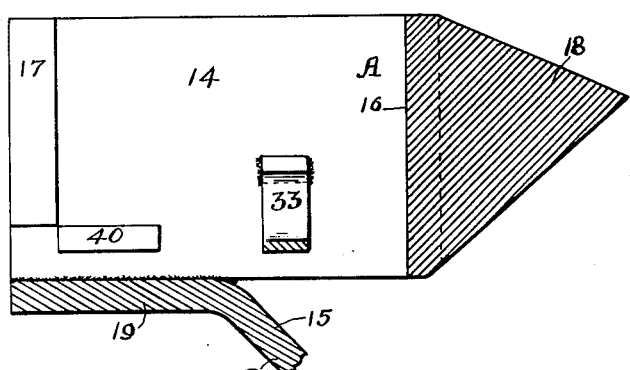
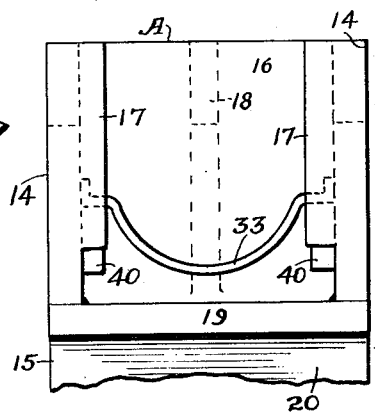
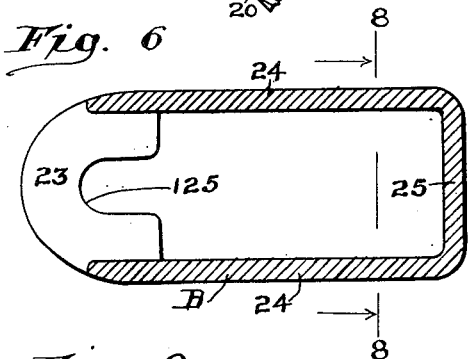
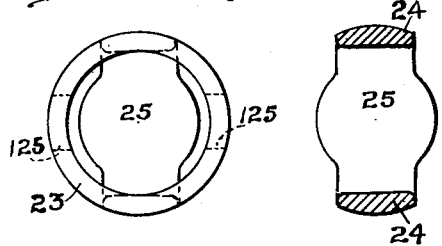
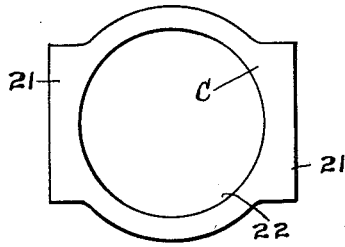
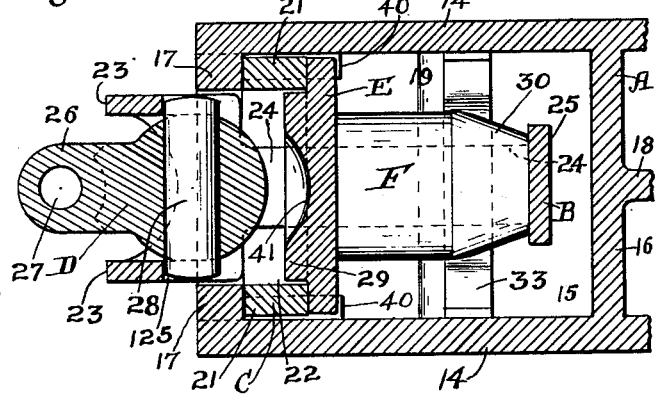
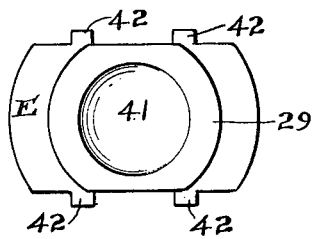
Inventors:
Carl A. Anderson.
Vernon S. Danielson.
By Henry Fuchs
Atty.

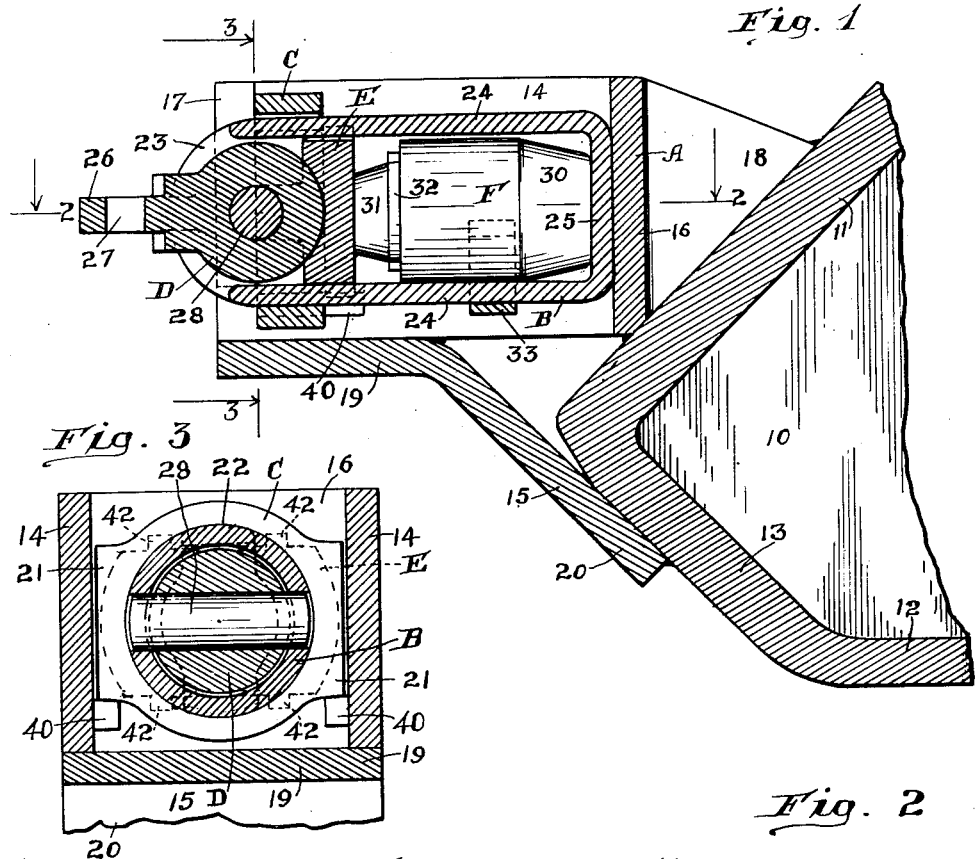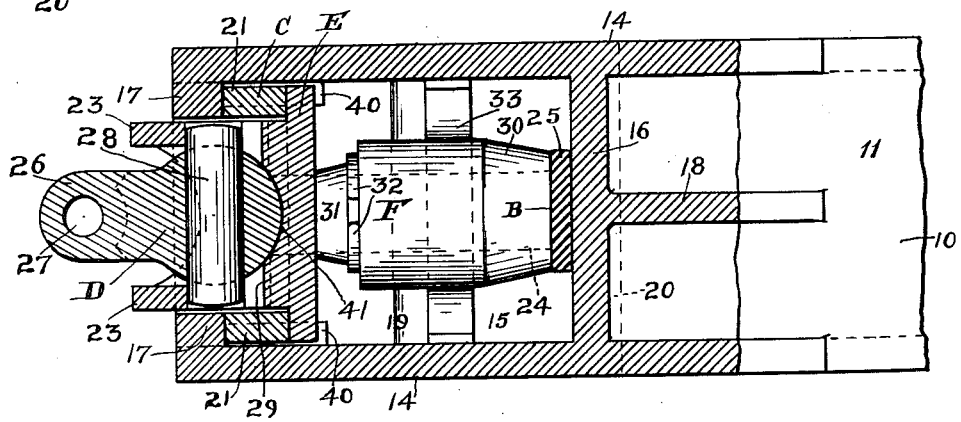

United States Patent Office 2,697,616
Patented Dec. 21, 1954

2,697,616

DRAFT AND BUFFER RIGGING FOR VEHICLES

Carl A. Anderson, Chicago, and Vernon S. Danielson, Dolton, Ill., assignors to W. H. Miner, Inc., Chicago, Ill., a corporation of Delaware Application May 14, 1951, Serial No. 226,172

3 Claims. (Cl. 280—481)

This invention relates to improvements in draft and buffer riggings for vehicles, and more particularly for such vehicles as army tanks.

One object of the invention is to provide for vehicles of the character described, adapted to be coupled to each other by means of the usual coupling members, draft and buffer riggings, including friction shock absorbing means designed to cushion draft and buffing shocks, wherein the draft and buffer rigging has pivotal connection with the coupling members to provide for universal pivotal adjustment of the same, and is further designed so that the coupling members are capable of rotary adjustment about their longitudinal axes.

A further object of the invention is to provide a draft and buffer rigging for vehicles provided with the usual coupling members, including a yoke mounted on the vehicle for axial rotary and longitudinal sliding movements, a friction shock absorber actuated by the yoke, front and rear stop means on the vehicle against which the friction shock absorber is compressible in draft and buff, and means providing a universal pivotal connection between said yoke and the usual coupling member, whereby universal pivotal, as well as axial rotary, motion of the coupling member is had with respect to the vehicle.

A more specific object of the invention is to provide a draft and buffer rigging for vehicles comprising a supporting frame structure fixed to the end of the vehicle, a yoke slidably guided for lengthwise movement and supported for axial rotation by said supporting means, a rear stop on said supporting means for restricting inward movement of the yoke, a front follower within the yoke, a front stop on said supporting means for limiting forward movement of said front follower, a friction shock absorber within the yoke bearing on said front follower and having shouldered engagement at its rear end with the yoke, and a connecting member having a pivotal connection with the yoke for swinging movement in one plane, and having means providing a pivotal connection with the coupler member for swinging movement of the coupler member in a plane at right angles to the plane of swinging movement of the connecting member.

Other objects of the invention will more clearly appear from the description and claims hereinafter following.

In the accompanying drawings forming a part of this specification, Figure 1 is a longitudinal, vertical sectional view of our improved draft and buffer rigging, illustrating the same applied to the end of an army tank, said end of the tank being also shown in longitudinal vertical section. Figure 2 is a horizontal, longitudinal sectional view, corresponding substantially to the line 2—2 of Figure 1. Figure 3 is a transverse, vertical sectional view, corresponding substantially to the line 3—3 of Figure 1. Figure 4 is a longitudinal, vertical sectional view, corresponding to Figure 1, of the supporting frame structure, said frame structure being partly broken away. Figure 5 is a front elevational view of Figure 4, that is, looking from left to right in said figure. Figure 6 is a longitudinal, vertical sectional view of the yoke of our improved rigging. Figure 7 is a front elevational view of Figure 6, looking from left to right in said figure. Figure 8 is a transverse, vertical sectional view, corresponding substantially to the line 8—8 of Figure 6. Figure 9 is a front elevational view of the bearing element for supporting and guiding the yoke of our improved rigging. Figure 10 is a front elevational view of the front follower of the rigging. Figure 11 is a broken view, similar to Figure 2, showing the parts in different positions.

Our improved draft and buffer rigging comprises broadly a supporting frame structure A, a yoke B, a bearing element C, a swivel block D to which the coupler of the rigging is attachable, a front follower plate E, and a friction shock absorbing mechanism F within the yoke B.

In Figure 1, 10 indicates the front end portion of a well-known design of army tank. As shown, this front end portion includes a forwardly extending, downwardly inclined upper wall 11, a horizontal bottom wall 12, and a forwardly extending, upwardly inclined wall 13 connecting the bottom wall 12 and the upper wall 11.

The supporting frame structure A of our draft and buffer rigging is secured to the walls 11 and 13 of the tank 10, and includes a pair of laterally spaced, longitudinally extending plates or draft sills 14—14, and a supporting bracket 15. The plates or sills 14—14 are connected adjacent their rear ends by a transverse web or wall 16. At the front end, the sills 14—14 are provided with vertically extending, laterally inturned flanges 17—17 which form front stop members or shoulders. The end portions of the sills 14—14, rearwardly of the transverse wall 16, are welded to the wall 11 of the tank 10, the lower sides of said end portions being cut off at an inclination corresponding to the inclination of the wall 11. The top edges of said rear end portions of the sills 14—14 are preferably beveled off, or inclined, as shown in Figure 1. A rearwardly extending bracing web 18 is preferably provided on the wall 16, the same being welded to the wall 11 of the tank and being located between the rearwardly extending portions of the sills.

The bracket 15 comprises an angularly bent bar, having a horizontal upper arm 19 and an inclined lower arm 20, the latter being secured to the wall 13 of the tank, being preferably welded thereto, as shown.

The bearing element C is in the form of a heavy plate-like block member, having laterally projecting supporting wings 21—21. The bearing element C is arranged transversely between the sills 14—14 with the front sides of the wings 21—21 thereof abutting the inner or rear sides of the flanges 17—17, and the wings supported on inwardly extending, horizontal ribs 40—40 on the sills 14—14, rearwardly of the flanges 17—17. The vertically extending flat side end edges of the wings 21—21 bear directly on the inner sides of the sills, thus holding the bearing element against rotation about the longitudinal central axis of the mechanism. The bearing element C has a central, relatively large bearing opening 22 of circular outline, forming a guide for the front end portion of the yoke B.

The yoke B comprises a hood portion 23 at its forward end, top and bottom arms 24—24 extending rearwardly from the hood portion, and a vertically extending end section 25 connecting the rear ends of the arms 24—24. The hood portion 23 of the yoke is of cylindrical, tubular cross sectional form, as most clearly shown in Figures 3 and 7, and the top and bottom arms 24—24 thereof present longitudinally extending, transversely curved outer surfaces, as shown in Figure 8, to correspond to the cylindrical tubular contour of the hood portion 23 of said yoke. In other words, the top and bottom surfaces of the arms 24—24 are rounded, and form continuations of the rounded top and bottom surfaces of the hood portion 23 of the yoke, while the inner surfaces of these arms are flat. The walls of the hood portion 23, at opposite sides thereof, are provided with transversely aligned, horizontally extending, rearwardly opening slots 125—125 for a purpose hereinafter described. The cylindrical hood portion 23 of the yoke is journaled for rotation and supported for lengthwise movement in the bearing element C, the hood portion 23 fitting the opening 22 of said element.

The swivel block D serves to connect the yoke B to the usual coupler and is of generally ball-shaped formation, having a forwardly extending tongue portion 26, provided with a vertically disposed pin receiving opening 27, adapted to accommodate a pivot pin, not shown, extending through the rear end of the shank of the usual coupler for supporting the coupler for pivotal swinging movement. The block D is pivotally connected to the yoke B by a pin 28 extending transversely through the block D and having its opposite ends projecting into and engaged within the slots 125—125 of the yoke. The rounded ball-shaped contour of the block D permits swinging movement of the block in the hood portion 23 of the yoke about the axis of the pin 28. As shown, the pivotal axis of the pin 28 is at right angles to the axis of the pivot pin opening 27 of the tongue 26 of the block D, thereby providing for universal swinging movement of the coupler with respect to the yoke B. Further, inasmuch as the yoke B is rotatable about its longitudinal axis in the bearing element C, rotary adjustment of the coupler about its longitudinal axis is provided in addition to the universal swinging movement thereof.

The follower E is in the form of a plate disposed within the yoke at the forward end thereof between the top and bottom arms 24—24 immediately in back of the hood portion 23. The follower E has a cylindrical central boss 29 at its forward side, projecting into the hood 23. The boss 29 is provided with a concave bearing seat 41, adapted to fit the rear side of the ball-shaped swivel block D and support the same in its swinging movement. The follower E fits between the top and bottom arms of the yoke B so that it is rotatable in unison with the latter. The follower E has top and bottom sets of laterally spaced, projecting guide lugs 42—42 thereon, embracing the yoke arms 24—24 at opposite sides. The follower E is thus guided for lengthwise movement with respect to the yoke by the lugs 42—42 and 42—42. The opposite end portions of the follower E project laterally outwardly beyond the yoke B and are adapted to engage in back of the bearing element C to restrict outward movement of said follower. As shown most clearly in Figure 10, the opposite ends of the follower E are rounded off to provide clearance for rotation of the follower about the longitudinal axis of the mechanism between the sills 14—14.

The shock absorbing mechanism F is of a well-known type, including the usual spring resisted friction clutch slidingly telescoped within a friction shell, the clutch comprising a central wedge and friction shoes surrounding the wedge. In the drawings, the friction shell is indicated by 30 and the clutch and shoes by 31 and 32, respectively.

The rear end portion of the yoke B is preferably supported by a saddle strap 33 having its opposite ends welded to the inner sides of the sills 14—14.

The operation of the improved mechanism is as follows: Upon a pulling force being transmitted to the swivel block D by the usual coupler connected thereto, the yoke B is pulled outwardly by the connecting pin 28, as shown in Figure 11, thereby forcing the friction shell 30 forwardly and compressing the friction shock absorbing mechanism against the follower E, which at this time is held stationary by engagement with the bearing element C, which is in abutment with the flanges 17—17 of the sills 14—14. During buffing action, that is, upon inward movement of the swivel block D, the follower E is forced inwardly of the yoke, compressing the friction shock absorbing mechanism F between said follower and the vertical end section 25 of the yoke, the latter being held stationary during this action inasmuch as the rear end of the same is in abutment with the web 16 of the sills 14—14. During buffing action, inward movement of the swivel block D with respect to the yoke is permitted by the slot and pin connection with the yoke, the pin 28 being slidable rearwardly in the slots 125—125 of the yoke during this action.

As will be evident, our improved construction of draft and buffer rigging provides for not only universal swiveling of the coupler connections between the two coupled tanks but, in addition, relative rotation of the coupler connections with respect to the tanks, thereby also compensating for relative twisting movement of the tanks with respect to each other.

We claim:

1. In a draft rigging for vehicles, the combination with laterally spaced sills fixed to the vehicle; of front stop means on said sills; a rear stop on said sills; a bearing element bearing on the inner side of said front stop means, said element being provided with a bearing opening; a yoke slidably and rotatably supported in said element between said sills, said yoke being engageable with said rear stop to limit rearward movement of said yoke, said yoke having means thereon for connecting the same to a coupler; a follower within the yoke engageable with said element to limit forward movement of said follower; and a friction shock absorbing mechanism within the yoke engaged between the follower and the rear end of said yoke.

2. In a draft rigging for vehicles, the combination with laterally spaced sills fixed to the vehicle; of front stop means on said sills; a rear stop means on said sills; a bearing element abutting the rear side of said front stop means; a yoke journaled in said bearing element for rotation about its longitudinal axis; a follower in said yoke engageable with the bearing element for limiting outward movement of said follower; a swivel block; a pivot pin extending through said swivel block and connected to said yoke, said swivel block having a forwardly projecting tongue adapted for connection to a coupler, said tongue having an opening therethrough adapted to receive a pivot pin, the axis of said last named pivot pin opening being at right angles to the axis of said pivot pin; and a friction shock absorbing mechanism within the yoke bearing on said follower.

3. In a draft rigging for vehicles, the combination with laterally spaced sills fixed to said vehicle; of front stop means on said sills; rear stop means on said sills; a bearing element abutting the rear ends of said front stop means; a yoke journaled in said bearing element and also slidable lengthwise in the same, said yoke having pin receiving slots therein extending lengthwise thereof; a follower in said yoke engageable with the rear side of said bearing element for limiting outward movement of said follower; a swivel block; a pivot pin extending through said block and connecting the same to the yoke, said pin having its opposite ends extending into the slots of the yoke, said swivel block bearing on said follower, said swivel block having a forwardly projecting tongue thereon provided with a pin receiving opening, the axis of said opening being at right angles to the axis of said pivot pin which connects the swivel block to the yoke; and a friction shock absorbing mechanism within said yoke bearing at its opposite ends on said follower and the rear end of said yoke, the rear end of said yoke being engageable with said rear stop means for limiting rearward movement of said yoke.

References Cited in the file of this patent

UNITED STATES PATENTS

| Number | Name | Date |
|---|---|---|
| 1,352,151 | Simonson | Sept. 7, 1920 |
| 1,654,939 | Loebs | Jan. 3, 1928 |
| 1,991,684 | Ketel | Feb. 19, 1935 |
| 2,057,658 | Bryant | Oct. 20, 1936 |
| 2,285,580 | Hanson | June 9, 1942 |
| 2,551,709 | Skinner | May 8, 1951 |